Inventor
Dana A. Griffin

April 26, 1949.   D. A. GRIFFIN   2,468,398
ELECTRICAL IMPEDANCE TESTING BRIDGE
Filed Aug. 3, 1943   4 Sheets-Sheet 3
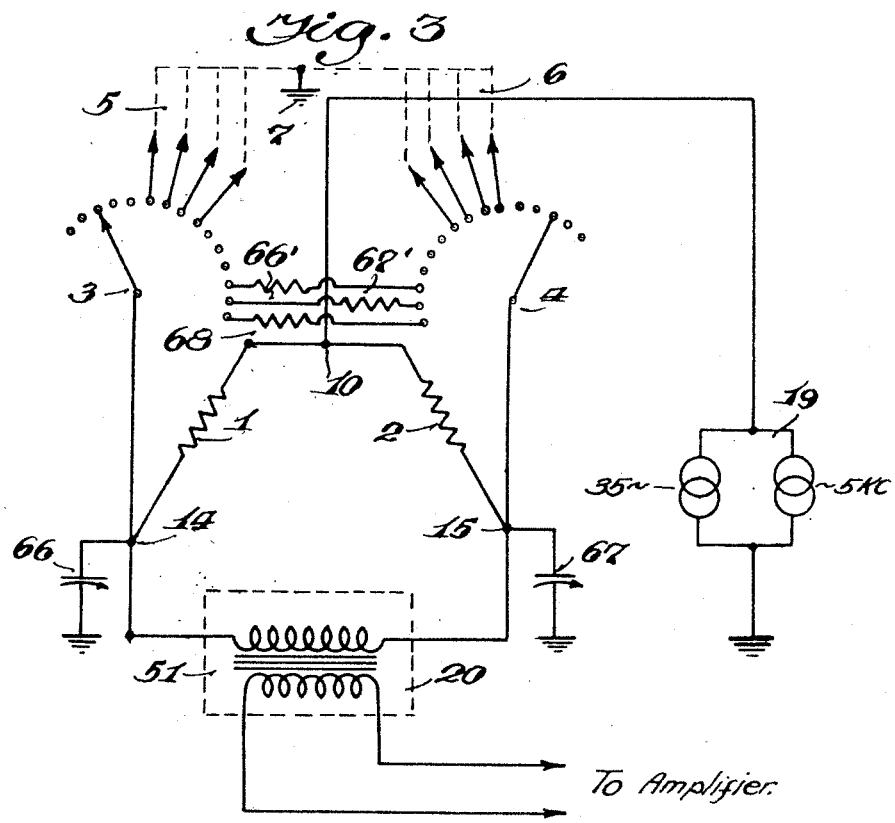
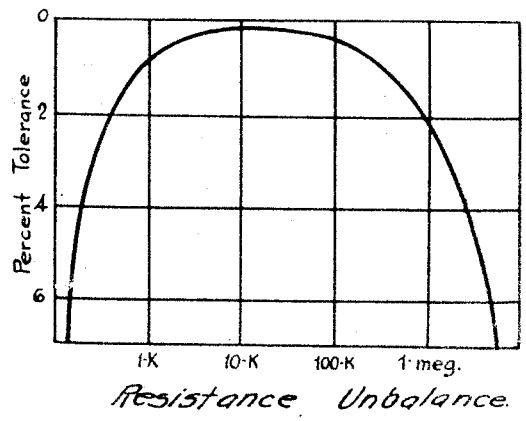
Inventor
Dana A. Griffin

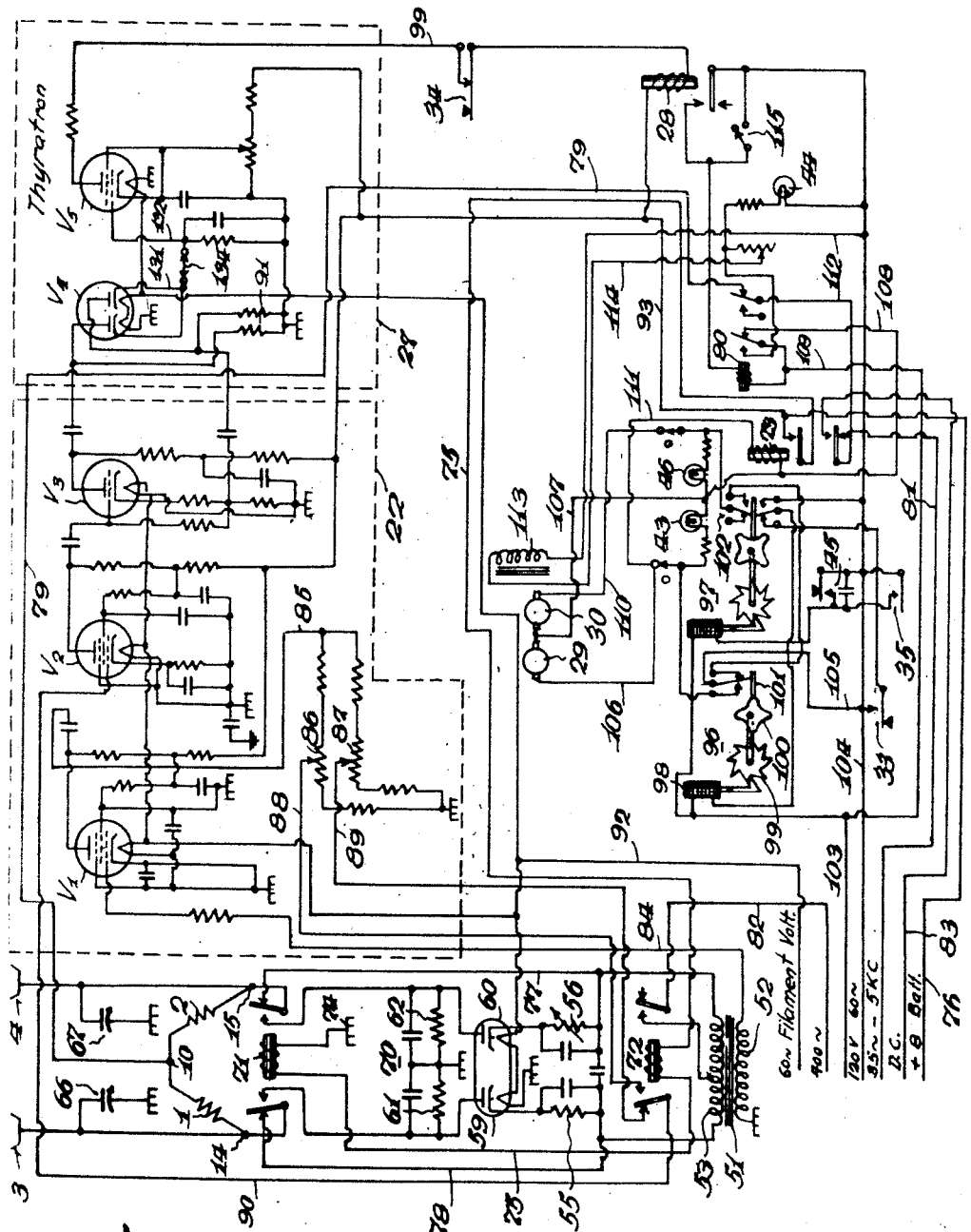

Patented Apr. 26, 1949

2,468,398

UNITED STATES PATENT OFFICE 2,468,398

ELECTRICAL IMPEDANCE TESTING BRIDGE

Dana A. Griffin, North Plainfield, N. J.

Application August 3, 1943, Serial No. 497,197

4 Claims. (Cl. 175—183)

1

This invention pertains to method and apparatus for automatically testing or "trouble shooting" circuits of electrical equipment, and is especially adapted to the rapid testing and location of faults in complex circuits of electrical equipment produced in quantity.

Apparatus in accordance with the invention is adapted to test automatically, in rapid succession, the various circuits of electrical equipment for resistance, capacity and inductance values within required tolerances. Also the apparatus may be employed for similarly locating shorts, open circuits, grounds, excessive leakage, etc.

In accordance with the basic principle of the invention the various circuits of a piece of equipment under test are progressively compared by means of a resistance or reactance bridge, as may be appropriate, with the corresponding circuits of a similar piece of equipment employed as a standard. In testing for resistance values within required tolerances, grounds, or open circuits, or excessive leakage, the resistance type of bridge is employed. Conversely in checking inductance or capacity values, the reactance type bridge is used.

In accordance with the testing technique, corresponding circuits of the test piece and standard are employed as one pair of balancing bridge arms, the other pair of which are fixed. If the circuit under test is sufficiently close to the standard, i. e. within the required tolerance, the bridge unbalance will be insufficient to actuate suitable indicating equipment in the detecting bridge arm, the converse being true outside the tolerance limits.

For rapid comparison of corresponding circuits in the test piece and the standard, the circuits of each are connected from ground to the fixed bridge arms respectively through corresponding contacts of a pair of rotary switches operated in unison. As these switch arms sweep over successive contacts, corresponding units of the test piece and the standard are successively connected as arms of the bridge for sufficient intervals to accomplish the tolerance test comparison.

In accordance with a preferred modification of the invention as employed for resistance, capacity and inductance testing of production equipment such as radio sets or other electronic equipment coming off the assembly line, the construction, operation and testing technique may be outlined as follows:

A standard set known to be correctly wired and having component parts values selected so

2 that the resistance, capacitance and inductance values in each circuit are in the middle of the required tolerance range, is plugged into the production testing machine through a series of cables. As sets of similar design come off the assembly line they, too, are connected to the tester through a group of cables. A motor revolves a rotary switch, successively and momentarily connecting comparable circuits in each set to the bridge. Bridge design is such that each circuit in the set from the assembly line is compared with the same circuit in the standard set from the standpoint of resistance to ground. The bridge circuit is then altered and another motor returns the rotary switch through all circuits back to the starting position, comparing circuit reactances.

While the tester is making resistance and reactance comparisons any divergence in values beyond the tolerances for which the bridge circuits are adjusted causes the rotary switch to stop. A dial indicates the number of the circuit in which divergence from the standard is encountered. Thus the operator may note down this circuit-identifying number. A re-set button is then depressed, causing the rotary switch to continue its travel until another defective circuit is encountered. Upon completion of this static test the operator has a complete list of numbers identifying circuits which require inspection. If no circuit troubles are encountered, a large number of circuits may be tested for both resistance and reactance in a small time interval. For example in a particular modification which has been thoroughly demonstrated, up to 120 circuits may be tested for resistance and reactance values within four minutes.

It is particularly interesting to note at this point that wiring capacitances within the set under test and in the standard used for comparison are included as part of the reactance test. This is important in many instances. Wiring capacitance in an electronic device may represent an appreciably large percentage of the total capacitance included in a particular circuit.

Referring now to the drawings:

Fig. 3 is a circuit diagram of the reactance bridge portion of the apparatus as arranged for inductance and capacity testing;

Fig. 4 is a graph depicting the measurable resistance unbalance between the standard and test circuits using the apparatus of the invention;

Fig. 5 is a complete circuit diagram of the entire apparatus corresponding to the block diagram of Fig. 1.

Figure 1:
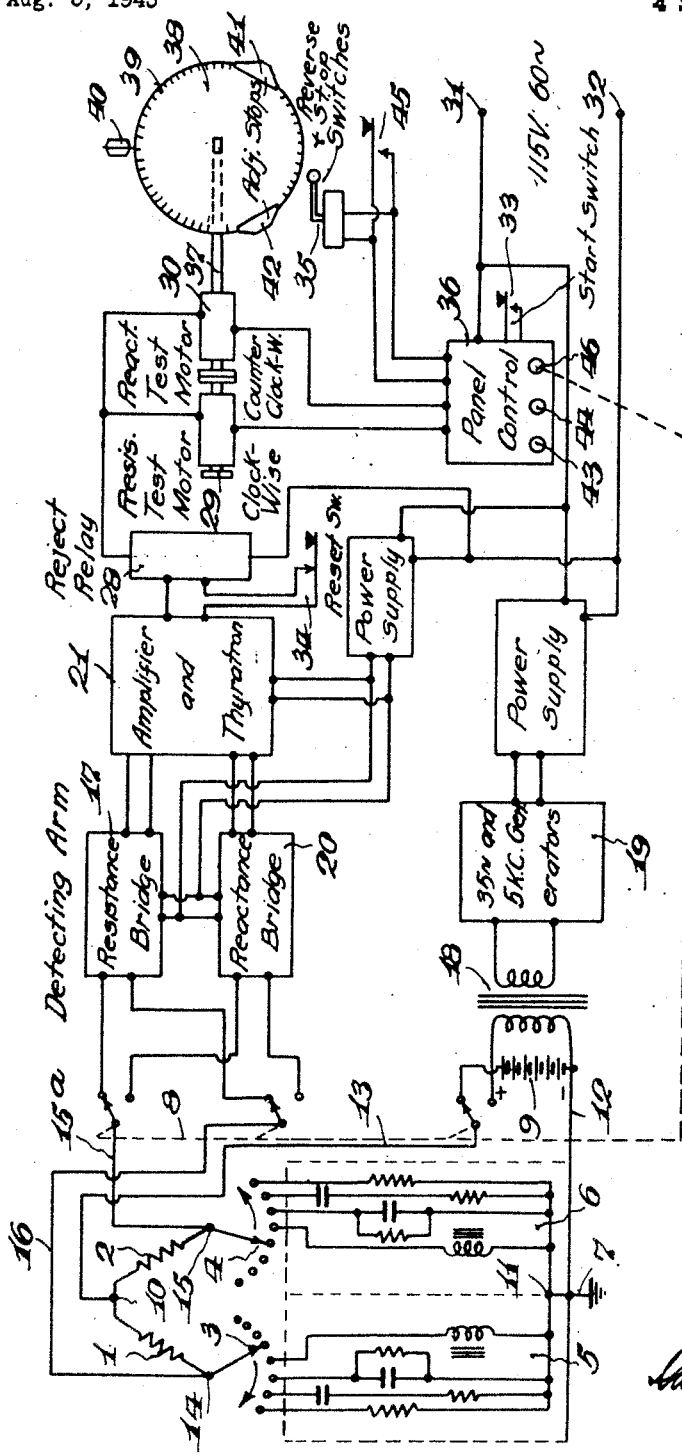
Fig. 1 is a "block diagram" of the automatic tester in accordance with a preferred modification of the invention and showing the essential components and operative arrangement thereof.

Referring to the block diagram of Fig. 1, the bridge circuit includes as one pair of balancing arms, fixed resistances 1 and 2, which are connected through contacts of a pair of rotary switches 3, 4 with the other pair of balancing arms 5 and 6. Arms 5 and 6 comprise various circuit components of the set under test and the standard set respectively. For illustrative purposes only four circuit components are shown in the drawing as containing respectively, inductance, shunt resistance and capacity, series resistance and capacity, and resistance. All circuits are referred back to ground as shown at 7. Circuits 5 and 6 are illustrative of typical circuits which may be tested. Testing comparisons are not limited to such simple circuits, however, but include the various resistance, capacity and inductance combinations found in electronic and other electrical equipment.

Depending on whether suitable switching 8 is actuated to one or the other of two positions as explained below, the bridge is arranged for the automatic testing of resistances on the one hand or of reactances on the other. If the switch is thrown to the up position, as shown, the circuit is arranged for resistance testing. To this end, the bridge is energized from a source of direct current voltage 9 bridged between opposite points 10, 11 of the bridge over conductors 12, 13. The remaining bridge points 14, 15 are connected over conductors 15a, 16 and through upper contacts of switch 8 to the detecting bridge arm for measuring resistance tolerances as shown by rectangle 17, Fig. 1, and in circuit arrangement within rectangle 17, Fig. 2, as explained hereinafter.

With switch 8, Fig. 1, operated to the lower position bridge points 10, 11 are energized through transformer 18 from an alternating current source 19, composed of a relatively high and a relatively low frequency, for example 35 cycles and 5 kilocycles for reasons explained below and as illustrated at 19 in Fig. 3. Bridge points 14, 15 are now connected over conductors 15a, 16 to a detecting arm 20 for measuring reactance tolerances, the circuit arrangement being as shown within rectangle 20 of Fig. 3. The outputs of the resistance bridge detecting arm 17 and of the reactance bridge detecting arm 20 are fed to an amplifier and thyratron arrangement indicated at 21, Fig. 1, the amplifier circuit being as shown within rectangle 22 of Fig. 5, and the thyratron circuit as shown within rectangle 27 of Fig. 5.

The thyratron output contains a reject relay 28 associated with resistance and reactance test motors 29 and 30, the one rotating in a clockwise direction when energized and the other in a counterclockwise direction. Motors 29 and 30 are energized from the usual house supply of low voltage alternating current connected to input terminals 31, 32. The control circuit for these motors includes, in addition to the reject relay 28, a start switch 33, a reset switch 34, a reversing and stop switch 35 and manually operated switch 45 in multiple therewith, and a control panel 36.

The circuit arrangement of these various components is shown in the lower portion of Fig. 5, together with additional refinements to be described hereinafter.

Motors 29 and 30 are mounted on a common shaft 37 terminating in a large indexing disc 38, provided with a scale 39 cooperating with a stationary marking indicia 40 to indicate at each instant the particular circuit 6 of the test set being tested. The indexing disc 38 is provided with a pair of adjustable stops 41, 42, each adapted to operate switch 35 upon contacting and thereby actuating the switch arm thereof. The rotary switches 3 and 4 are likewise driven from shaft 37 by obvious means not shown.

It will be helpful at this point to outline the general scheme of operation of the equipment by reference to the block diagram of Figure 1, before proceeding to a more detailed discussion of the circuits involved. With the standard and test sets connected as shown at 5 and 6, the starting switch 33 is pressed. This actuates switch 8, in a manner described below, to connect the resistance bridge 17, Figs. 1 and 2, to points 14, 15 of the bridge and starts the resistance test motor 29 rotating. At the same time a green pilot light 43, Fig. 1, labelled "Resistance" lights on the control panel. As the switch arms 3, 4, driven by motor 29 through shaft 37 as aforesaid, revolve, all resistance paths back to ground through circuits 5 and 6 are successively compared. The panel control is such, as later described, that by depressing the starting switch 33 a second time, motor 29 is deenergized and a magnetic brake applied to arrest the contact arms of rotary switches 3, 4 at any desired contact point. As motor 29 revolves it also drives the indexing disc 38, keyed to shaft 37, thereby to indicate the circuit under test at each instant by virtue of scale 39 thereon cooperating with the stationary indicia 40.

If all elements in the set under test are within required limits, the motor drive continues without interruption through all circuits. If on the other hand a resistance is missing, open, shorted or out of tolerance, the reject relay 28 in the thyratron output is operated, to cut off motor 29, apply a magnetic brake to shaft 37, and light a red "Reject" lamp 44 on panel 36. The operator notes the number of the defective circuit by reference to the scale 39 on the indexing disc 38 in relation to the fixed indicia 40. Then the reset switch 34 is pressed, which resets the reject relay 28 and reapplies driving power to motor 29. The above procedure is repeated in the event other defective circuits are encountered, and all defective circuits noted, preferably on an inspection tag.

Upon completion of the resistance test, the reactance test is made using the bridge circuit of Fig. 3. This can be done manually by depressing the push-button switch 45 wired in multiple with switch 35. Ordinarily, however, the change is effected by one of the adjustable stops 41, 42 on the indexing disc 38, actuating the arm of switch 35 as the disc is revolved by motor 29. The circuit is so arranged as described below with reference to Fig. 5, that at the end of the resistance test, when switch 35 is actuated as aforesaid, switch 8 is actuated to its lower position to arrange the bridge circuit as shown in Fig. 3, and to connect the multiple frequency generator 19 across the bridge points 10, 11. At the same time motor 29 is cut-off and the oppositely driven motor 30 energized to reverse the direction of travel of the rotary switches 3, 4. Also an amber pilot lamp 46 on the control panel 36 lights up to indicate that the apparatus is now actuated for reactance testing. The switch arms 3, 4 now retrace their paths, comparing all circuit for capacitance and inductance variation. The second of the adjustable stops 41, 42 is so positioned on the indexing disc 38 as to again actuate switch 35 at the instant the rotary switch arms 3, 4 are returned to that initial position. When this occurs motor 30 is automatically cut off and the unit is ready to test another set. As in the case of the resistance test, the reject relay 28 will operate to stop motor 30, and thereby arrest movement of the switch arms 3, 4 and indexing disc 38, when a test circuit 6 is encountered which is outside the tolerance limit for the corresponding circuit 5 of the standard.

Figure 2:
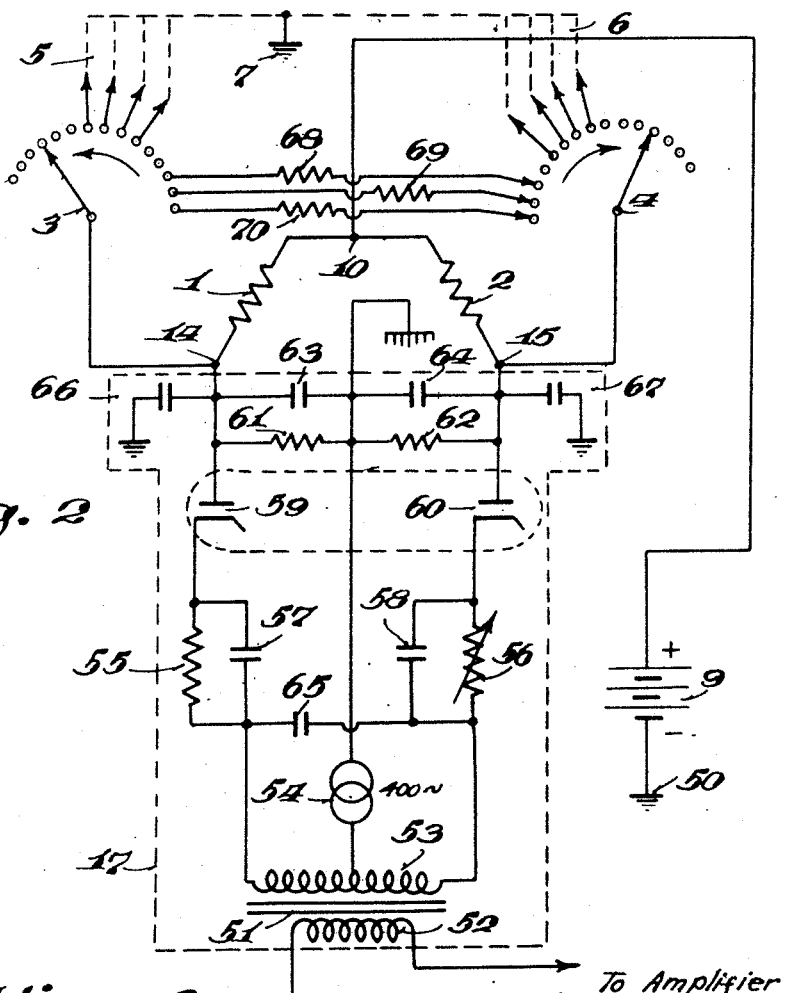
Fig. 2 is a circuit diagram of the resistance bridge portion of the apparatus as arranged for resistance testing.

Referring now to Figure 2, the bridge circuit for making resistance comparisons comprises, as in Fig. 1, a pair of balancing arms 1 and 2 of fixed and equal resistance value, and a pair of balancing arms 5 and 6 comprising circuit components of the standard and test sets, as determined, at any instant, by the positions of the rotary switches 3 and 4. The bridge is energized by the source of direct current voltage 9 having one terminal grounded at 50 and the opposite terminal connected to point 10 of the bridge. During the interval that the rotary switch arms 3, 4 are connected to circuit components of the standard and test sets which are capable of transmitting direct current, such current will flow from battery 9 to bridge point 10, dividing thereat and flowing in parallel paths through resistors 1 and 2 and circuit components 5 and 6 respectively to ground at 7 returning to the battery through ground 50.

The accompanying absence of or degree of potential difference established between bridge points 14 and 15 due to the flow of direct current thus traced, will constitute a measure of the identity or dissimilarity of the circuit components 5 and 6 under test.

For purposes of accurately measuring this potential difference, free from extraneous pick-up, transient effects and drift characteristics otherwise resulting from the use of direct current amplifiers, as explained below, the detecting circuit shown within the rectangle 17 and actuated by alternating current, is connected between the bridge points 14 and 15. This circuit comprises a two-winding transformer 51, the secondary 52 of which is connected to the input of amplifier 21, Fig. 1. The primary winding 53 is connected at its midpoint to one terminal of a low frequency alternating current generator 54, preferably of the order of about 400 cycles per second; and is connected at its opposite outer terminals, respectively, through resistors 55 and 56, shunted by condensers 57 and 58, to the cathodes respectively of a pair of diode rectifiers 59 and 60. The plates of these rectifiers are connected respectively to the bridge points 14 and 15 as shown, and are connected together through fixed and equal resistors 61 and 62, shunted by condensers 63 and 64, the midpoints between which are tapped to the upper terminal of generator 54. A condenser 65 is bridged across the secondary winding 53 of the transformer; also the bridge points 14 and 15 are connected to ground through condensers 66 and 67 respectively.

With reference to operation of the circuit above described, when the rotary switches 3, 4 are connected to circuits 5, 6 of the standard and test set respectively having equal resistance paths to ground, the bridge circuit will be balanced and the flow of direct current through the bridge arms from battery 9 will produce no potential difference between bridge points 14, 15, and hence the flow of current through resistors 61, 62 will be zero. Under these conditions the 400 cycle generator 54 will cause rectified currents which are equal in amplitude and phase to flow oppositely through the respective halves of the transformer primary 53, the capacity shunted resistors 55, 57 and 56, 58, diodes 59, 60 and thence through the capacity shunted resistors 61, 63 and 62, 64 back to the generator 54. In consequence no voltage will be induced in the transformer secondary 52. In this connection resistor 56 is made variable to provide an adjustment to compensate for commercial variations in diodes 59 and 60.

If an unbalance occurs in the bridge, caused by an unbalance in the standard and test circuits 5, 6, a direct current potential drop develops across resistors 61, 62, due to current flow from battery 9. This in turn causes the flow of rectified current from source 54, through the diodes 59 and 60, to vary in opposite directions, one drawing more rectified current and the other less. The flow of rectified current through the opposite halves of the transformer primary 53 will be correspondingly modified, the one half passing more current and the other less. The unbalanced component thus set up will induce a proportional voltage in the secondary winding 52, to be impressed on the input to the amplifier thyratron circuit 21, Fig. 1. If the voltage is sufficiently high, i. e. outside the tolerance limit for the circuit under test, the reject relay 28, Fig. 1, will be actuated with results above discussed.

One advantage of this method of detecting bridge unbalances, i. e. by controlling an alternating current signal by a shift in direct current voltage is that, since small direct current voltages (in the order of 20 microvolts) are to be detected, the alternating current voltage may also be small. Practice has shown that the 400 cycle source 54 need not deliver over ½ volt. A further increase in amplitude produces a more unfavorable ratio of balanced to unbalanced output voltages. This, then, means that even large direct current transients of the order of several hundred volts on the diode plates can produce only a limited amount of alternating current on the first amplifier grid, thereby protecting it from unduly large overloads.

Resistance variations of 5 percent from 200 ohms to 5 megohms can easily be detected as shown in Fig. 4, comprising a graphical representation of the measurable resistance unbalance between the standard and test circuits 5, 6.

In order to limit the sensitivity in the mid-range, provision is made to clip in resistors such as 68, 69, 70 between corresponding terminals of the rotary switches 3, 4, which effectively shunt the bridge.

The circuit arrangement of Fig. 2 for use as the detecting bridge arm for making resistance tests, was devised by reason of the following considerations. The problems encountered in the design of a suitable circuit for making a true direct current test of resistance values are numerous. At the outset, direct current amplifiers were looked upon with disfavor because of their inherent drift characteristics, plus the problem of eliminating the effects of transient voltages. The matter of transients is one of considerable importance when it is considered that in passing from a circuit of several hundred ohms to one of several megohms, the voltage changes on the bridge arms are of the order of 100 volts. Further, since it is almost a mechanical impossibility to insure that both contactors of rotary switches 3 and 4 "make" at the same instant on all sets of contacts, this condition becomes more serious. Observing the transients set up on the bridge arms with an oscilloscope has shown this clearly. In order to avoid false rejects due to transients, it is necessary to disarm the circuit until the contactors are centered on their respective test circuit contacts, as explained below.

Another problem encountered in making the resistance test is that of extraneous sixty cycle pickup on the cables to the external bridge arms from the power supply connected to terminals 31, 32. With a compromise value of 20,000 ohms chosen as the fixed ratio arms 1, 2 of the bridge, tests have shown that an amplifier gain of 40 decibels are required for satisfactory operation of the equipment. While this is not considered high gain it is still sufficiently high to produce trouble from pick-up or the input leads to the rotary bridge arm contacts. The problem is further complicated by the fact that a testing speed of one circuit per second for the equipment will not permit the use of large resistance-capacity filters to eliminate the hum, because of their high time constants when subjected to large transient voltages. Inductance capacity filters also present the problem of direct inductive pick-up from strong sixty cycle fields.

In the circuit of Fig. 2, these difficulties are largely eliminated. Power is supplied to the bridge arms 1 and 2, the test set and the standard set, by a 200 volt-regulated supply. Capacitors 66, 67 attenuate the sixty cycle pick-up on the diode plate load resistors 61, 62, while condensers 63, 64 offer a low reactance path for the 400 cycle signal source across the load resistors. Condenser 65 tunes the transformer primary 53 to resonate at the signal frequency, attenuating the residual harmonics produced when the circuit is balanced.

Referring now to Fig. 3, the bridge circuit for making reactance tests is more or less conventional. Like numbered elements of Figs. 2 and 3 are the same and require no further description. Capacitors 66, 67 serve in this instance to balance the slight variations in wiring and transformer capacitances. The bridge is fed from the multiple frequency source 19 comprising a relatively low frequency of about 35 cycles and a relatively high frequency of about 5 kilocycles.

In case of the reactance tests, if just one frequency is applied to the bridge, a serious loss in flexibility will occur. At extremely low and high values of resistance or reactance, bridge sensitivity falls off appreciably. For example, with 5 kilocycles applied to the bridge it would be extremely difficult to detect 10 percent variation in a one microfarad capacitor because of its low value of reactance at this frequency. At 35 cycles, however, the reactance would appear as several thousand ohms rather than several ohms, thus effectively raising the bridge sensitivity. Naturally, the reverse is true in the case of small capacitances.

In practice some experimentation is advisable in adjusting respective levels of these two frequencies. This is dictated by the tolerance requirements for each specific type of equipment to be tested. If the requirements place greatest emphasis on maintenance of close tolerances on high reactance values, more 5 kilocycle amplitude is employed. The 35 cycle amplitude is similarly adjusted to take care of the low reactance values. This is a compromise but it does allow considerable leeway on the part of the set-up engineer.

The question of tolerance values leaves something to be desired on the reactance test in that the same sensitivity control resistor used in making the resistance test is of necessity employed when making the reactance test. However, this is largely offset by the fact that bridge sensitivity in the reactance position can be controlled by varying the amplitude of both the 35 cycle source and the 5 kilocycle source independently. Any attempt to switch the tolerance control resistor involves a cumbersome and extremely complex switching system. Furthermore, in actual practice it would be impossible to hold the tolerance value of a capacitor to the same percentage as that of the resistance when the two are in shunt, since it is obvious that if the resistor were held to plus or minus 5 percent tolerance, the percentage variation of the reactance value would of necessity have to be greater. Fortunately also, capacitors in general need not be held to as close limits as resistances, commercial practice often being to hold the majority of capacitances to at least twice the percentage tolerance to which resistance is held. Obviously, if the circuit under test contains no direct current path back to ground it can be given an excellent reactance test because the tolerance control resistor may then be chosen to limit sensitivity on the reactance test alone.

No set figures can be given regarding the ultimate capabilities of the unit on a reactance test, particularly as resistance components are so often included in circuits. However, inductance values of 1 milhenry or larger can easily be checked. A variation of 10 percent in the value of large electrolytic capacitors can be checked at one end of the scale, while 30 percent variation of a 50 microfarads capacitor can readily be detected at the other extreme. Smaller capacitance variations are likely to become confused with slight variations in the capacitance of connecting cables.

It might be well to point out the need for two separate tests, one for resistance and one for reactance. Two tests are made in order to secure the greatest amount of information concerning the set under test. Obviously, if the circuit under test contains just capacity or any series combination such as RC, LC, or RLC, a direct current test would detect only shorted capacitors. And shunt circuits such as RC, LC, RL, RLC cannot be compared readily with direct current applied to the bridge insofar as the reactive component is concerned. If an attempt were made to check resistance and reactance values simultaneously by applying an alternating current voltage to a direct current bridge, there would be the possibility that two incorrect values of shunt R and C, for instance, might result in an impedance value equal to the correct RC summation, thereby falsely indicating a good circuit. By first subjecting every circuit capable of passing a direct current to a true direct current test this possibility of error can be avoided and an accurate resistance test can be made as well.

Fig. 5 shows the complete circuit diagram for the apparatus illustrated in block diagram form in Fig. 1, including the bridge circuits of Figs. 2 and 3. Like elements are similarly numbered in the various figures. In Fig. 5, only the rotary arms of the rotary switches 3 and 4 are shown, the fixed contacts and associated standard and test circuit components 5 and 6 being omitted.

Referring to Fig. 5, the bridge circuits of Fig. 2 and 3 are shown at the left in combined form for alternative connections as indicated generally by the numeral 70. Circuit connection of the bridge in accordance with Fig. 2 or alternatively in accordance with Fig. 3 depends on the operation or release of a pair of serially connected relays 71 and 72, which in turn are controlled by a relay 73. Relays 71 and 72 are connected in a circuit extending from ground at 74 over a conductor 75 to the upper armature of relay 73, thence through the associated upper or "make" contact of this relay and over a conductor 76 to a source of +B voltage connected thereto as indicated. The operation of relay 73 will be described below.

If relays 71 and 72 are released as shown, the bridge will be arranged in accordance with Fig. 3, in which case the secondary winding 53 of transformer 51 will be connected directly between the bridge points 14 and 15 over conductors 77 and 78 and through the back contacts of relay 71. At the same time the multiple high and low frequency voltage, viz. 35 cycles and 5 kilocycles, is applied to bridge point 10 over a circuit traced from bridge point 10 over conductor 70, outer back contact and armature of a relay 80, lower armature and back contact of relay 73 to conductor 81 to which the source of multiple frequency is connected as indicated. This corresponds to the connections of source 19 in Fig. 3, and completes the bridge circuit arrangement of Fig. 3, which attains so long as relay 73 is released.

If, however, relay 73 is actuated, it will close through its upper armature and upper contact, the circuit above traced from battery on conductor 76 and over conductor 75, to ground at 74 through the windings of relays 72 and 71, whereupon these relays will operate to convert the bridge circuit from the arrangement of Fig. 3 to that of Fig. 2. With relays 71 and 72 thus energized, a source of 400 cycle voltage is applied to the midpoint of the transformer secondary 53, over a conductor 82 and thence through the right armature and front contact of relay 72. At the same time the transformer primary 53 is disconnected from bridge points 14 and 15 at the back contacts of relay 71, due to operation thereof, and the rectifier tube circuit 59, 60 (to which winding 53 is permanently connected and shown) is connected to these bridge points through the front contacts of relay 71. The above mentioned operation of relay 73, also disconnects at its lower armature and back contact, the source of multiple frequency (35 cycles and 5 kilocycles) from bridge point 10, and substitutes therefor a direct current voltage applied over conductor 83 through the lower make contact and lower armature of relay 73, and outer back contact and armature of relay 80 to conductor 79 extending to bridge point 10. This corresponds to the arrangement of Fig. 2.

The secondary transformer winding 52 is connected from ground as shown and over conductor 84 to the control grid of an electronic tube $V_1$ comprising the input to a resistance coupled amplifier 22 which includes amplifier tubes $V_1$, $V_2$ and $V_3$. The amplifier is of more or less standard construction, and hence requires no detailed description, the coupling and biasing resistors, bypass condensers, etc. being clearly shown in the drawing and their functions well understood by those skilled in the art.

The output or plate electrode of tube $V_1$ extends to ground over conductor 85 and through a pair of parallel connected rheostats 86, 87. The variable taps of rheostat 86 and 87 are connected over conductors 88 and 89 to the left front and back contacts respectively, of relay 72, the left armature of which is connected over a conductor 90 to the control grid of the second amplifier tube $V_2$. Thus if relay 72 is released to provide the reactance bridge circuit arrangement of Fig. 3, as explained, the gain on tube $V_2$ is controlled by rheostat 87; whereas rheostat 86 controls the gain if relay 72 is operated to provide the resistance bridge arrangement of Fig. 2. In this way independent amplifier gain adjustments are provided for the reactance and resistance bridges respectively.

The cathode-anode output of the last amplifier tube $V_3$ is impressed across a potentiometer 91, grounded at its midpoint as shown, and also connected thereat to the cathodes of a double rectifier tube $V_4$, the anodes of which are connected respectively, to opposite terminals of potentiometer 91, to provide full wave rectification of the amplifier output. The rectified output of tube $V_4$ is in turn impressed between cathode and control grid of a thyratron tube $V_5$.

The filaments of all of the tubes are energized from a low voltage source of 60 cycle current connected to conductor 92 and supplied therefrom to the various filaments over obvious multiple circuits shown in the drawing and hence requiring no description. The anodes and screen grids of the various tubes are energized from a source of +B voltage connected to conductor 76 and thence over conductor 93 to multiple connections extending to the various tube anodes, screen grids, etc., which connections are likewise apparent from the drawing.

The thyratron output circuit extends from its anode over conductor 99 containing the reset switch 34 and the winding of reject relay 28, and thence to conductor 93 extending to the source of +B voltage over conductor 76 as explained. Accordingly when the thyratron is fired by a sufficiently large unbalance voltage on the resistance or reactance bridge, the reset relay 28 will operate and remain operated until the thyratron plate current is extinguished by depression of the reset switch 34 to momentarily open the plate circuit.

As was explained with reference to the block diagram of Fig. 1, the rotary switches 3, 4 are driven in one direction for resistance testing by motor 29 and in the opposite direction for reactance testing by motor 30. The testing cycle is initiated by depression of the start switch 33 to energize motor 29 and to arrange the bridge circuit for resistance testing. As the resistance test proceeds any bridge unbalance beyond the required tolerance causes the thyratron to fire and operate the reject relay 28, thereby to stop motor 29, as explained below, until started again by operation of the reset switch 34. At the end of the resistance test, one of the adjustable stops 41, 43 on the motor driven indicator dial 38, actuates the reverse switch 35, to disconnect motor 29, energize motor 30, and arrange the bridge for reactance testing. As before, bridge unbalances outside the tolerance limits, fire the thyratron and arrest motor 30 through energization of relay 28 until started again by actuation of the reset switch 34. At the end of the reactance test the remaining stop on the indicator dial 38, again actuates switch 35 to stop motor 30 and restore the apparatus to its initial condition. The circuit arrangements by which these operations are accomplished will now be explained.

The motor control circuit includes a pair of stepping relays 96, 97, each provided with a solenoid, as at 98, the armature of which serves as a pawl actuating a ratchet wheel, as at 99, to the shaft of which is keyed a switch cam, as at 100, provided with alternate teeth and depressions as shown, for actuating the switch arm of an associated switch, such as 101, alternately to the right and then to the left for successive energizations of the solenoid. Stepping relay 96 thus controls switch 101; while stepping relay 97 similarly controls switch 102. Operation of the stepping relays is such that switches 101 and 102 are never open, being closed on either their right or left contacts at all times depending on whether the switch cam presents a tooth or depression to the associated switch cam.

The stepping relays 96, 97 and the motors 29, 30, are energized from a source of 120 volt, 60 cycle current connected between conductors 103, 104. An energizing circuit for relay 96 is traced from the lower power conductor 104, through contacts of the start relay 33, lower left contact and switch arm of switch 102 and through the solenoid winding of relay 96 to the upper power conductor 103. An energizing circuit for stepping relay 97 is traced from conductor 104 through contacts of the reverse and stop switch 35, and the solenoid winding of relay 97 to conductor 103. An energizing circuit for motor 29 is traced from conductor 104, over conductor 105, through the switch arm and left contact of switch 101, thence through motor 29 over conductors 106, 107, thence over conductor 108 through the inner back contact and armature of relay 80, and over conductor 109 to conductor 103. A green pilot lamp 43 is wired in parallel with motor 29, as shown, and is energized while the motor is operating over the circuit above traced.

An energizing circuit for motor 30 is traced from conductor 104, over conductor 105, switch arm and right contact of switch 101, thence through the upper right contact and switch arm of switch 102, through motor 30 over conductors 110 and 107, to conductor 108, returning thence to conductor 103 over the circuit above traced for motor 29, extending through the inner back contact and armature of relay 80. An amber pilot lamp 46 is wired in parallel with motor 30 and is lighted over the circuit above traced during energization of the motor.

As was explained above, relay 73 controls the operation of relays 71, 72 in the bridge circuit, and thereby determines whether the bridge is arranged for resistance or reactance testing. During operation of the motor 29 the bridge should be arranged for resistance testing in accordance with Fig. 2. To this end relay 73 is connected over conductor 111 in parallel with motor 29, so that both will be energized and deenergized simultaneously over the operating circuit above traced for motor 29. Energization of relay 73 will also operate the bridge relays 71, 72 as explained to arrange the bridge circuit in accordance with Fig. 2 for resistance testing during operation of motor 29. Conversely relay 73 will remain deenergized to release relays 71, 72 during operation of motor 30, thereby to arrange the bridge circuit for reactance testing in accordance with Fig. 3 during this period.

Relay 80 comes into play during either resistance or reactance testing to stop the motor and completely deenergize the bridge upon operation of the reset relay 28 in response to a bridge unbalance outside the tolerance range and consequent firing of the thyratron V5. Relay 28 controls the energization of relay 80 over a circuit traced from the lower power lead 104 through the armature and upper or "make" contact of relay 28, thence through the winding of relay 80 to the upper power lead 103 over conductor 109. Thus relay 80 is operated during operation of relay 28.

As explained above the energizing circuits for both motors 29 and 30 employ a common return path to the upper power lead 103, traced over conductor 108 and through the inner back contact and armature of relay 80. Accordingly when relay 80 operates in response to the actuation of relay 28, the operating circuits for both motors 29 and 30 are opened at the inner back contact of relay 80 to stop whichever motor is running.

At the same time the operation of relay 80 closes a circuit through its inner armature and front contact to apply a magnetic brake to the motor shaft for stopping the motor abruptly at contacts of the rotary switches 3, 4, where an unbalance occurs. The magnetic brake circuit is traced from the lower power lead 104 over conductor 112, through the winding 113 of the magnetic brake, thence over conductor 114 through the inner front contact and armature of relay 80 to conductor 109 and thence to the upper power lead 103. Wired in multiple with the magnetic brake is a red pilot light 44 to indicate that the motor has been arrested by reason of a bridge unbalance between the standard and test sets 5 and 6, Fig. 1.

In addition, the operation of relay 80 removes all energizing voltage from the bridge point 10 whether connected to the direct current voltage on lead 83 or the multiple frequency voltage on lead 81. It will be recalled that these voltages are supplied to the front and back contacts respectively associated with the lower armature of relay 73, and thence through the outer armature and back contact of relay 80 to bridge point 10. Hence, operation of relay 80 removes these voltages from bridge point 10.

Having now described the circuit arrangement of the entire system, the operation will be briefly recapitulated with reference to Fig. 5. At the start of a test the system is initially in the condition shown in the drawing with stepping relays 96 and 97 as shown. To initiate the test, start switch 33 is momentarily depressed thereby to actuate and release relay 96 whereby it steps around one step. This closes the circuit for motor 29 through the switch arm and left contact of switch 101 to start this motor, and also operates relay 73 to arrange the bridge for resistance testing.

Motor 29 will now continue to run causing the rotary switch arms 3, 4 to pass successively over the fixed contacts to compare circuit components 5, 6, Fig. 1, of the standard and test sets. When a circuit in the test set is encountered which is outside the tolerance limits, thyratron V5 will fire thus operating relay 28 which in turn operates relay 80. Operation of the latter opens the circuit of motor 29 and applies the magnetic brake 113, to stop the rotary switches 3, 4 on the switch contacts where the unbalance occurs. At the same time the red pilot light 44 lights up. The operator notes from the indicating dial 38, Fig. 1, the number of the circuit where the unbalance occurs, and then momentarily depresses the reset switch 34. This extinguishes the thyratron V₅ and releases relay 28 which in turn releases relay 80 to close the circuit of motor 29, open the circuit of the magnetic brake and extinguishes the red pilot lamp 44.

If during the course of the test the operator wishes to arrest the rotary switches at any particular contact, this can be done by momentarily depressing the start switch 33 thus momentarily energizing the stepping relay, thus causing it to step around one step and open the motor circuit at the left contact of switch 101. When the operator desires to resume the test, a further momentary depression of switch 33 will again cause relay 96 to step around one more step and again close the motor circuit through the left contact of switch 101.

Subject to the interruptions above noted, motor 29 will continue to run until the rotary switches have traversed all switch contacts, whereupon one of the adjustable stops 41, 42 on the indicator dial 38, will momentarily actuate switch 35. This will operate the other stepping relay 97 causing it to step around one step, and in so doing will close a circuit to operate relay 96 and likewise cause it to step around one step. This latter circuit is traced from the lower power lead 104, through the lower right contact and switch arm of switch 102 and thence through the solenoid winding of relay 96 to the upper power lead 103. Following these operations switch 101 will be positioned as shown in the drawing, but switch 102 will be stepped around one step, i. e. the switch cam for switch 102 will be positioned the same as for switch 101. Accordingly the circuit of motor 29 will be opened at the left contact of switch 101 and relay 73 will release to arrange the bridge for reactance testing. At the same time the energizing circuit for motor 30 will be closed from lower power lead 104, over conductor 105, switch arm and right contact of switch 101, upper right contact and switch arm of switch 102, over conductor 110 and through the motor 30 to conductor 108, through the inner back contact and armature of relay 80 to the upper power lead 103 as above described.

Motor 30 will thus operate to return the rotary switches to their initial position to effectuate the reactance testing. Any bridge unbalance firing the thyratron V₅ will, as before, operate relays 28 and 80 to stop motor 30 at any contact of the rotary switches at which the unbalance occurs. To resume testing the reset switch 34 is momentarily depressed with results as above noted.

When the rotary switches 3, 4 have been returned to their initial positions, the remaining stop 41 or 42 on the indicator dial will engage and momentarily depress switch 35. This will again energize relay 97 causing it to step around one step, thereby opening the circuit of motor 30 at the upper right contact of switch 102 which will thus be returned to the position shown in the drawing. Also the energizing circuit for relay 96 will also be opened at the lower right contact of switch 102, but this will merely cause the pawl associated with ratchet 99 to slip down without stepping the relay around. Relay 96 will accordingly remain in the position shown in the drawing. Thus both motor circuits will now be open and relays 71, 72, 73, 80 and 28, released, as shown in the drawing. The system is then ready to test the next set by the cycle of operations above described. A manually operated switch 115 is connected in shunt with the contacts of relay 28 to perform the functions of this relay manually if desired. Also a manually operated switch 45 is wired in multiple with the reverse and stop switch 35 for manual duplication of its functions.

Figure 6:
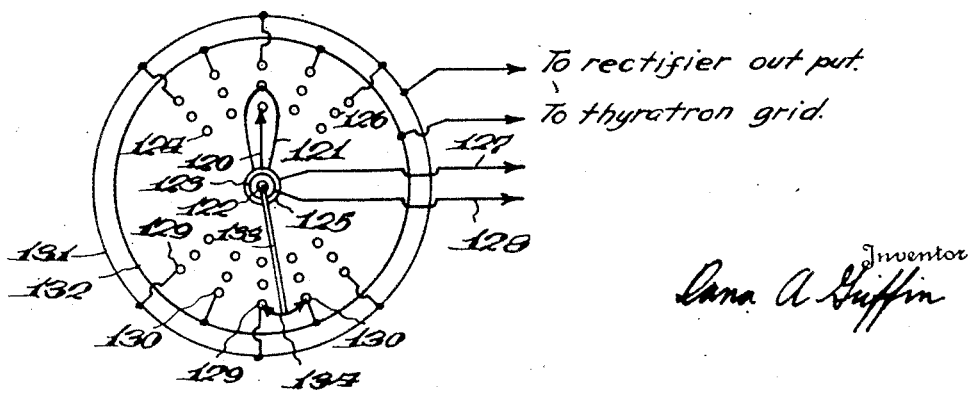
Fig. 6 is a diagrammatic showing of the rotary switches including special features of construction referred to hereinafter.

The rotary switches 3, 4 are constructed and assembled in accordance with the principles illustrated diagrammatically in Fig. 6, which includes a special arrangement for disabling the circuit to prevent false rejects which would otherwise be caused by transient voltages set up as the switches shift from one set of contacts to the next.

Referring to Fig. 6; the rotating arms 120, 121 of the rotary switches are mounted on a common shaft 122, reversibly driven by motors 29, 30, Fig. 1. Rotary arm 120 carries at its axial end an insulated slip ring 123, and at its outer end, sweeps across an inner ring of spaced stationary contacts as at 124. Rotary arm 121 carries at its axial end an insulated slip ring 125, and, at its outer end, sweeps across an intermediate ring of spaced, stationary contacts, as at 126. Connections from slip rings 123, 125 to bridge points 14, 15, Fig. 1, are made over conductors 127, 128, which terminate at the slip rings on stationary shoes (not shown) slidably engaging the slip rings.

In order to prevent false operations of the thyratrons due to transient voltages set up as the switch arms shift from one set of stationary contacts 124, 126 to the next, a so-called "arming" switch is provided which makes it impossible for the thyratron to fire and lock up the reject relay, except when the switch arms 120, 121 are exactly centered on a pair of stationary contacts 124, 126. The thyratron must thereafter be disarmed or rendered inoperative as the rotary switch arms pass from one set of stationary contacts to the next. This is accomplished with the arming switch by removing the amplifier output connection from the thyratron grid except under the conditions of centering above mentioned. Thus large transient inputs to the amplifier can not produce false operations of the thyratron because they do not reach the grid thereof.

In order to arm the circuit as aforesaid when the rotary switch arms 120, 121 are exactly centered on a pair of contacts, and to disable the circuit at all other times, an additional outer ring of stationary contact is provided, as at 129, 130. These contacts 129 and 130 are connected alternately to a conductor 131 and to a conductor 132 as shown.

Conductor 131 is connected to the output of rectifier V₄, Fig. 5, and conductor 132 is connected to the grid of thyratron V₅. Keyed to shaft 122, is an insulating arm 133 which carries at its outer terminus a conductive shoe 134, adapted to slidably engage and interconnect a pair of adjacent contacts 129, 130 of the outer ring. Arm 133 is so mounted in relation to rotary switch arms 120, 121 as shown, that shoe 134 will bridge adjacent contacts 129, 130 of the outer ring just as the rotary switch arms 120, 121 become centered on a pair of contacts 124, 126. Conversely shoes 134 will break contact with contacts 129, 130 as the rotary switch arms 120, 121 move off their respective contacts 124, 126. This assures connection of the output of rectifier V₄ to the input of thyratron V₅, as shown at 131, 132, 134 Fig. 5, only when the rotary switch arms 120, 121 are centered on their respective stationary contacts.

I claim:

1. Apparatus for comparing a series of respectively similar standard and test circuits for resistance and impedance within preselected tolerances, comprising: an electrical bridge having a first pair of balancing arms of fixed impedance, and a second pair of balancing arms adapted for reception therein, respectively, of said test and standard circuits, together with conjugately disposed energizing and detecting bridge arms, a starting switch, a second switching means responsive thereto for arranging said bridge for direct current resistance testing, power driven switching means responsive to said starting switch for progressively connecting corresponding pairs of standard and test circuits in said second pair of bridge balancing arms respectively, for resistance and impedance comparisons, a fourth switching means responding automatically to completion of said resistance testing to arrange said bridge for alternating current impedance testing and for thereafter reversely actuating said power driven switching means to progressively reconnect corresponding standard and test circuits thereto for impedance comparisons, relay means responding to bridge unbalances exceeding said tolerances for arresting said power-driven switching means at any circuit pair for which said tolerance is exceeded, and means including a reset switch for thereafter reenergizing said power-driven switching means to continue said progressive switching.

2. Apparatus for comparing a series of respectively similar standard and test circuits for resistance and impedance within preselected tolerances, comprising: an electrical bridge having a first pair of balancing arms of fixed impedance, and a second pair of balancing arms adapted for reception therein, respectively, of said test and standard circuits, together with conjugately disposed energizing and detecting bridge arms, a starting switch, a second switch controlled means responsive thereto for arranging said bridge for direct current resistance testing, and power driven rotary switches responsive to said starting switch for thereafter progressively connecting corresponding pairs of standard and test circuits in said second pair of bridge balancing arms, respectively, for resistance and impedance comparisons, a third switching means responding automatically upon a completion of said resistance testing to arrange said bridge for alternating current impedance testing and for thereafter reversing said rotary switches to progressively reconnect said pairs of standard and test circuits thereto for impedance comparisons, a fourth switching means responding to bridge unbalances exceeding said tolerances for arresting the rotary switches at any circuit pair for which said tolerance is exceeded, manually controlled reset switching means for thereafter reenergizing said rotary switches to continue said progressive switching, and means including said third switching means responding automatically upon return of said rotary switches to an initial position to deenergize said apparatus.

3. Apparatus for comparing impedances of a series of respectively similar test and standard circuits within preselected tolerances, comprising: an electrical bridge having a first pair of balancing arms of fixed impedance, and a second pair of balancing arms adapted for reception therein, respectively, of said test and standard circuits, together with conjugately disposed energizing and detecting bridge arms, power driven switching means for progressively connecting corresponding pairs of standard and test circuits in said second pair of bridge balancing arms, respectively, means including a starting switch for initiating operation of said power-driven switching means, means responding to bridge unbalances exceeding said tolerances for arresting said power-driven switching means at any circuit pair for which said tolerance is exceeded, said means including a thyratron actuated by said unbalance and a relay responding thereto, and reset switching means for thereafter deenergizing said thyratron to release said relay and thereby reenergize said power driven switching means for continuing said progressive switching.

4. Apparatus for comparing a series of respectively similar standard and test circuits for resistance and impedance within preselected tolerances, comprising: an electrical bridge having a first pair of balancing arms of fixed impedance, and a second pair of balancing arms adapted for reception therein, respectively, of said test and standard circuits, together with conjugately disposed energizing and detecting bridge arms, a rotary switch for progressively connecting corresponding pairs of standard and test circuits in said second pair of bridge balancing arms, respectively, a pair of oppositely driven motors for reversibly driving said rotary switch, means including a first switch and associated stepping relay for arranging said bridge for direct current resistance testing and for energizing one said motor to drive the rotary switch in one direction for resistance testing, means including a second switch and an associated stepping relay responsive to completion of said resistance testing for arranging said bridge for alternating current impedance testing and for energizing the second said motor to drive said rotary switch in the opposite direction for impedance testing, relay means responsive to bridge unbalances exceeding said tolerances for arresting the driving motor and rotary switch at any circuit pair for which said tolerance is exceeded, reset switching means for thereafter reenergizing the driving motor to continue said testing, and means actuated by said rotary switch, and including said second switch and stepping relays, responsive to return of said rotary switch to an initial position for deenergizing said bridge and driving motor.

DANA A. GRIFFIN.

REFERENCES CITED

The following references are of record in the file of this patent:

UNITED STATES PATENTS

| Number | Name | Date |
| --- | --- | --- |
| Re. 21,003 | Knerr et al. | Feb. 14, 1939 |
| 598,517 | Heyman | Feb. 8, 1898 |
| 703,777 | Fisher | July 1, 1902 |
| 734,438 | Skinner | July 21, 1903 |
| 735,077 | Everest | Aug. 4, 1903 |
| 1,537,281 | Wunsch | May 12, 1925 |
| 1,611,460 | Klish | Dec. 21, 1926 |
| 1,653,313 | Sanner | Dec. 20, 1927 |
| 1,665,325 | Peterson | Apr. 10, 1928 |
| 1,665,397 | Wunsch | Apr. 10, 1928 |
| 1,768,299 | Simon | June 24, 1940 |

(Other references on following page)

UNITED STATES PATENTS

| Number | Name | Date |
|---|---|---|
| 1,931,054 | Butterfield | Oct. 17, 1933 |
| 1,931,460 | Lilienfeld | Oct. 17, 1933 |
| 2,027,814 | De Lanty | Jan. 14, 1936 |
| 2,090,505 | Uhle | Aug. 17, 1937 |
| 2,116,606 | Lemmon | May 10, 1938 |
| 2,132,214 | Myers | Oct. 4, 1938 |
| 2,221,556 | Roemisch | Nov. 12, 1940 |
| 2,246,575 | Coleman | June 24, 1941 |
| 2,255,002 | Rodanet | Sept. 2, 1941 |
| 2,329,491 | Sulzer | Sept. 14, 1943 |
| 2,339,116 | Smith | Jan. 11, 1944 |
| 2,407,361 | Wilson | Sept. 10, 1946 |

FOREIGN PATENTS

| Number | Country | Date |
|---|---|---|
| 417,251 | Great Britain | Oct. 1, 1934 |
| 502,711 | Great Britain | Mar. 23, 1939 |
| 524,341 | Great Britain | |

OTHER REFERENCES

An Automatic Production Tester, by Dana A. Griffin and Newton B. Smalley, reprinted from Electronics, February 1943, 8 pages, copy in Div. 48.